J. F. OAKES.
MOTOR SLED.
APPLICATION FILED JUNE 10, 1913.
1,098,523.
Patented June 2, 1914.
3 SHEETS—SHEET 1.
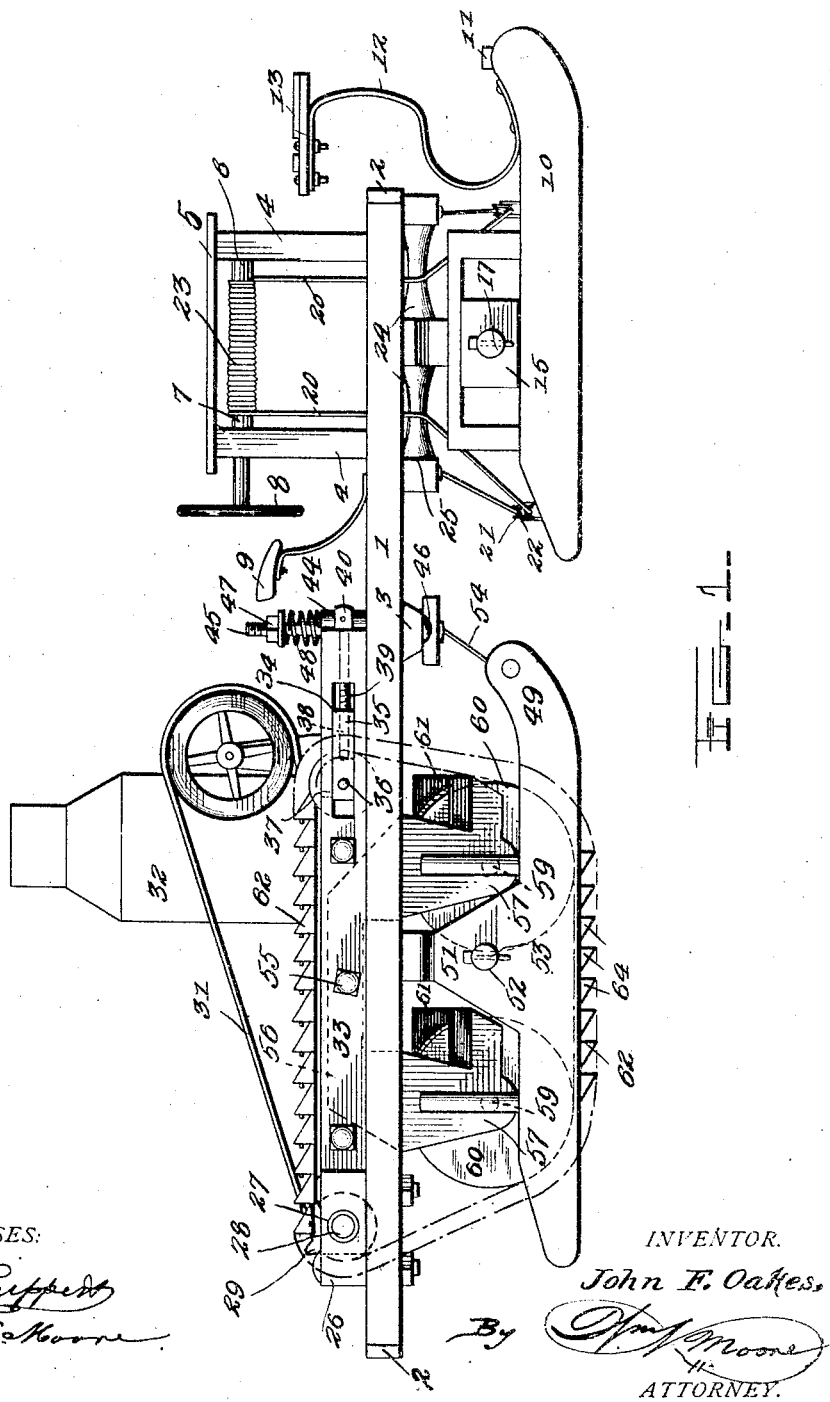
WITNESSES:
INVENTOR.
John F. Oakes,
By
ATTORNEY.

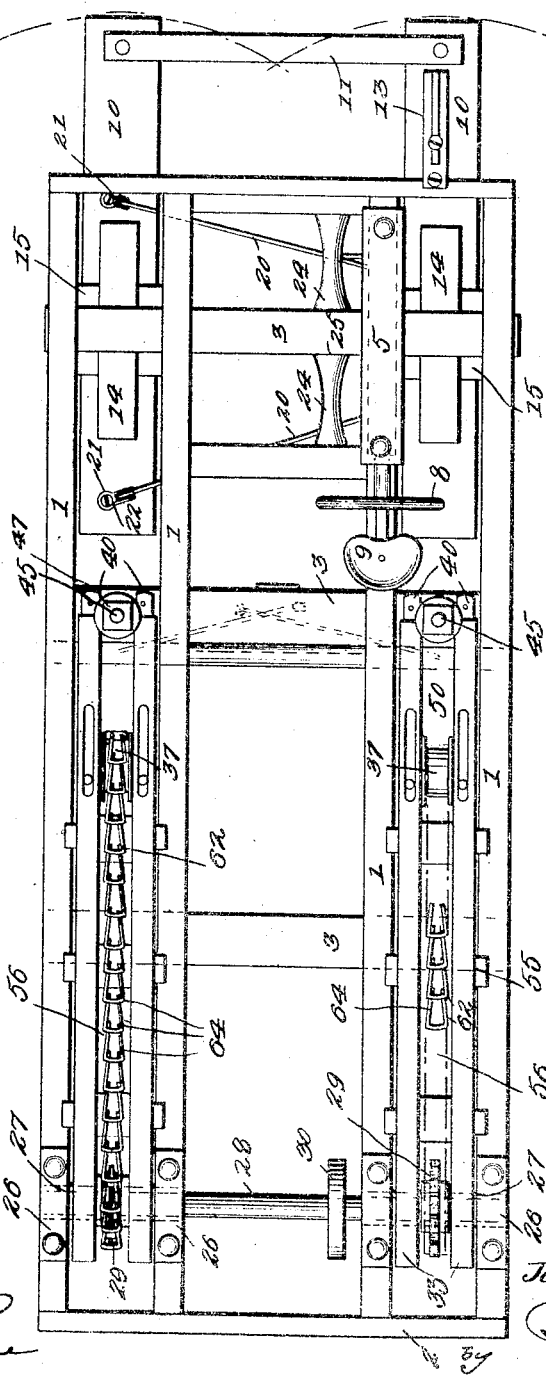

J. F. OAKES.
MOTOR SLED.
APPLICATION FILED JUNE 10, 1913.
1,098,523.
Patented June 2, 1914.
3 SHEETS—SHEET 3.
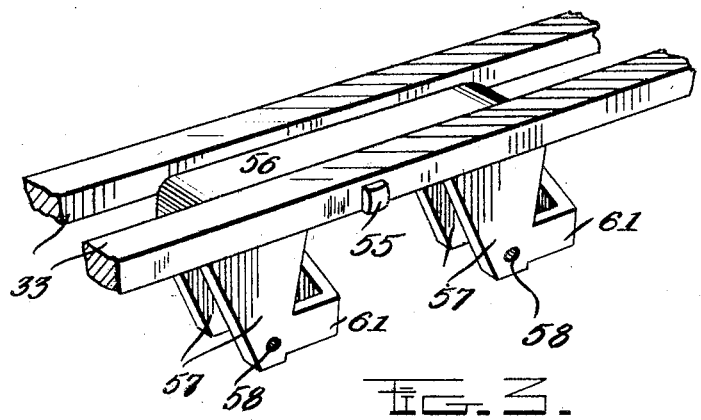
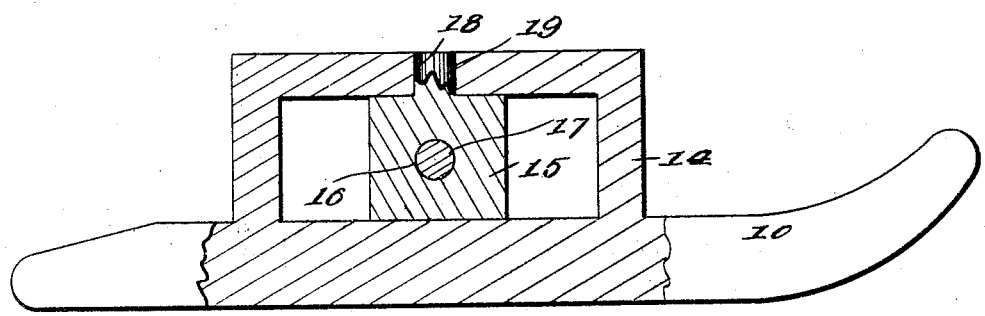
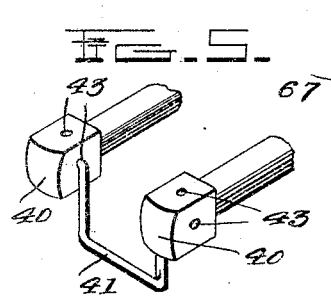
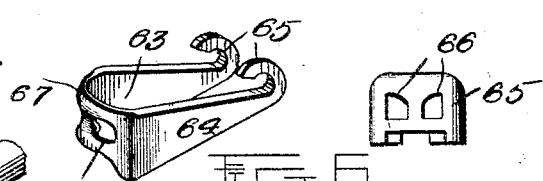
Inventor
John F. Oakes,
By
Attorney
Witnesses under the forward portion of the frame rises the pair of uprights 4, connected by

UNITED STATES PATENT OFFICE.

JOHN FRANCIS OAKES, OF COPOS, MINNESOTA.

MOTOR-SLED.

1,098,523.  Specification of Letters Patent.  Patented June 2, 1914.

Application filed June 10, 1913. Serial No. 772,865.

*To all whom it may concern:*

Be it known that I, JOHN FRANCIS OAKES, a citizen of the United States, residing at Copos, in the county of Washington and State of Minnesota, have invented certain new and useful Improvements in Motor-Sleds, of which the following is a specification.

My invention relates to improvements in motor sleds, adapted for carrying or drawing light or heavy loads and operated by motive power such as steam, electricity, or gasolene, and one object of the invention is the provision of a sled of this character which can be easily controlled, which can be operated with a comparatively small amount of power and which will travel in a rapid and smooth manner.

Another object of my invention is the provision of a motor driven sled which will be strong and durable, inexpensive of production and thoroughly efficient and practical in every respect.

With these objects in view my invention consists of a motor driven sled embodying novel features of construction and combination of parts for service, substantially as shown, described and particularly pointed out in the claims.

Figure 1 is a side elevation of a motor driven sled constructed in accordance with and embodying my invention. Fig. 2 is a top plan view of the complete sled, the motor or operating mechanism not being shown. Fig. 3 is a perspective view of one of the bearings which form the mounting for the wheels which guide the driving chain. Fig. 4 is a side elevation, partly broken away of one of the forward sleds or runners taken on an enlarged scale. Fig. 5 is a detail view of the means for securing or locking the adjusting rods used in conjunction with the bearing boxes for the upper set of guide pulleys or wheels, and Fig. 6 is a perspective view of one of the links of which the drive chains are composed.

In describing the construction of my sled the parts will be referred to by numerals, and the same part will be designated by the same numeral in each figure of the drawings.

The frame or supporting structure of my sled is oblong or rectangular and consists of the two pairs of longitudinal or side rails 1, which are disposed parallel and arranged a suitable distance apart, and are at their ends connected by cross pieces 2, and between said end pieces are disposed the series of intermediate cross pieces or rails 3, the whole forming a light structure possessing great strength and durability.

From the forward portion of the frame rises the pair of uprights 4, connected by the horizontal strip 5, and the uprights are provided with bearings 6, in which is mounted the drum shaft 7, having the hand wheel 8, for turning said shaft, said wheel being disposed conveniently to the operator's seat 9.

Arranged under the forward portion of the frame is the pair of front runners 10, connected by the strip 11, and one of said runners has mounted thereon the arm 12, which carries the sighting or guiding device 13, which enables the operator to properly guide or steer the sled. Upon the runners is mounted the pair of open boxes 14, in which fits the blocks 15, having openings 16, to receive the shaft bearing 17, and provided with vertical trunnions 18, which bear in openings 19, of said open frames 14.

From this construction it will be observed that the pair of front runners are mounted in such a manner as to permit of their movement to the right or left in guiding the sled and to effect this movement I provide the pair of cords or chains 20, having one end connected freely at 21, to the studs 22, and said cords or chains pass around the drum shaft as shown at 23, and the turning of said shaft by means of the hand or steering wheel winds the cords or chains in either direction, according to the direction of travel of the sled.

It is evident from the construction described that the sled can be easily controlled by the operator and the direction of travel be readily guided by means of the guiding device and also that the cords or chains will instantly turn the runners either to the right or left, and to keep the cords or chains taut under all conditions as well as to properly guide them I provide the pair of grooved guiding rollers 24, which receive and properly retain said chains or connections, the latter having their ends secured at 25, to one of the cross pieces of the frame.

To the rear of the frame upon the two pairs of longitudinal rails are secured the brackets 26, which are provided with bearings 27, for the driving shaft 28, said shaft carrying the pair of driving sprocket wheels 29, and having thereon the driving pulley 30, operated by the belt 31, from the driving pulley of the engine or motor 32, from which construction it will be observed that the power from the motor serves to drive the shaft with its sprocket wheels.

Upon the driving shaft is pivotally mounted the outer ends of the pairs of open frames 33, in whose inner ends are formed elongated openings 34, in which fit the boxes 35, in which are journaled the bearings 36, of the grooved guide wheels 37, the boxes being provided with threaded sockets 38, which receive the threaded adjusting rods 39, having the heads 40, for manipulating said rods, and said heads are locked in adjusted position by means of the bail 41, having its ends 42, bent at an angle and engaging openings 43, in the heads of said adjusting rods.

From this construction it will be observed that the two pairs of open frames which form the guides for the chains are pivoted and retained in this manner at one end while the inner end is free and carries adjustable chain guiding wheels, and at the inner end said frames are provided with a projection 44, in which projections fits the rods 45, having at their lower ends a head 46, bearing against the cross piece and passing upward through the cross piece and projections 44, with their threaded ends receiving an adjusting nut 47, and around said rods is placed the coil springs 48, which bear against the projections and adjusting nuts and form cushions or yielding connections for the inner ends of the frames, causing said frames to have an accommodating movement or action to agree with the movement of the runners or rear sleds 49.

The two sets of rear runners 49, are formed with channels 50, and are provided with a vertical portion or bracket 51, in which are bearings 52 for the shaft 53 on which the rear runners are mounted to rock, said runners being flexibly connected with one of the cross pieces of the frame by means of the pair of chains or cords 54, which allow the proper movement of said runners.

To the pair of frames and between the same is pivotally mounted at 55, the pair of members 56, each having depending therefrom the pairs of wheel bearing arms 57, having openings 58, to receive the journals 59, of the lower chain-guiding-wheels 60, said bearing arms being formed with inclined guards 61, which serve to throw the snow or accumulation away from the wheels and thereby prevent the wheels from being clogged.

From this construction it will be observed that I provide a pair of open pivoted frames which support a pair of wheel carriers, which wheel carriers are pivoted to the frame. I also provide a pair of pivoted and flexibly connected rear runners. For the purpose of driving the sled I employ the pair of driving chains 62, which pass around and are driven by the sprocket wheels 29, and are guided by the adjustable guiding wheels 37 in the forward portion of the pivoted frames, and also by the guiding wheels mounted in the pivoted members carried by said open frame, and also that the driving chains pass through the openings or channels of the rear runners and have their cupped portions 63 of their chain links 64, cut into the surface below the rear runners, as shown in Fig. 1. The chain sections are each formed with connecting hooks 65, and with openings 66, in their cupped portions 63, which permits of the sections being connected to provide the chain and the upper edge of the cupped portion of each chain link or section is preferably formed with a sharp edge 67, causing the chain to bite into and secure a hold on the snow or ice.

The operation of my sled will be readily understood from the foregoing description taken in connection with the accompanying drawings, and the power from the motor revolves the driving shaft, which imparts travel to the pair of driving chains which cut into the snow or ice and propel the sled, the operator controlling the steering of the sled by means of the wheel which operates the drum shaft connected with the forward runners, as will be readily understood. It is evident that I provide a motor sled which can be easily managed or controlled, which is strong and durable and capable of production at a low price and which will prove practical and desirable for the purposes intended.

I claim:

1. A motor driven sled, consisting of a frame, a pair of forward runners mounted in the frame and capable of a lateral movement, means for controlling the movement of said runners, a pair of open frames pivoted in the rear of the main frame, the driving shaft mounted in the frames and forming the pivotal connection for said frames, a motor for driving said shaft, a pair of rear runners mounted loosely upon the main frame, a pair of pivoted members carried by said pair of open frames and having depending arms provided with wheel bearings, wheels mounted in said bearings, sprocket wheels carried by the driving shaft and arranged between the pivoted ends of said open frames, a pair of drive chains passing around the sprocket wheels and over the said wheels and through the pair of rear runners to engage the surface for propelling the sled.

2. A motor driven sled, consisting of a frame, a pair of forward runners mounted in the frame and capable of a lateral or swinging movement, means for controlling the movement of said runners for guiding the sled, a motor mounted on the frame, a driving connection leading from the motor, a driving shaft mounted in the frame and receiving motion from the driving connection, a pair of sprocket wheels, secured on the driving shaft, a pair of open frames having their outer ends pivoted on said driving shaft, a pair of adjustable chain guiding wheels mounted in the inner free ends of said pivoted frames, spring connections between the inner ends of said pivoted frames and the main frame, a pair of rear runners flexibly connected with the main frame and formed with channels, wheel carriers pivotally mounted in the open frames and provided with guards, wheels mounted in said carriers, drive chains passing over the sprocket wheels, the foward adjustable guide wheels, the wheels of the pivoted carriers and through the channels of the runners.

3. In a motor driven sled, the combination with the main frame, the forward runners, the guiding mechanism for said runners, the motor, the rear runners, the driving chains, the open pivoted frame having the elongated openings in their inner ends, the sliding boxes in said openings, the chain guiding wheels journaled in said boxes, the adjusting rods for said boxes mounted in the frame, means for locking said rods in adjusted position, and a spring connection between the inner end of the frames and the main frame.

In testimony whereof I affix my signature in presence of two witnesses.

JOHN FRANCIS OAKES.

Witnesses:
  C. J. RUPPERT,
  WM. N. MOORE.